(12) United States Patent  
Chen et al.

(10) Patent No.: US 10,038,393 B1  
(45) Date of Patent: Jul. 31, 2018

(54) SINGLE-PHASE NON-ISOLATED INVERTER

(71) Applicant: National Chung-Shan Institute of Science and Technology, Taoyuan (TW)

(72) Inventors: Kun-Feng Chen, Taoyuan (TW); Woei-Luen Chen, Taipei (TW); Yi-Lun Chen, Yilan (TW); Jung-Yang Wang, Kinmen County (TW)

(73) Assignee: National Chung-Shan Institute of Science & Technology (TW)

( * ) Notice: Subject to any disclaimer, the term of this patent is extended or adjusted under 35 U.S.C. 154(b) by 0 days.

(21) Appl. No.: 15/801,322

(22) Filed: Nov. 2, 2017

(51) Int. Cl.
*H02M 7/537* (2006.01)
*H02M 7/53846* (2007.01)
*H02S 40/32* (2014.01)
*H02M 7/539* (2006.01)

(52) U.S. Cl.
CPC ..... *H02M 7/538466* (2013.01); *H02M 7/539* (2013.01); *H02S 40/32* (2014.12)

(58) Field of Classification Search
CPC ....... H02M 7/53; H02M 7/537; H02M 7/5387
USPC ................. 363/131, 132, 135, 136
See application file for complete search history.

(56) References Cited

U.S. PATENT DOCUMENTS

| | | | | |
|---|---|---|---|---|
| 8,988,915 | B2* | 3/2015 | Ku | H02M 7/53871 363/132 |
| 2005/0286281 | A1* | 12/2005 | Victor | H02M 7/48 363/131 |
| 2009/0316458 | A1* | 12/2009 | Gonzalez Senosiain | H02J 3/383 363/132 |
| 2012/0014153 | A1* | 1/2012 | Christoph | H02M 3/158 363/132 |
| 2014/0217827 | A1* | 8/2014 | Cheek | H02M 7/5387 307/66 |
| 2016/0268925 | A1* | 9/2016 | Hu | H02M 7/487 |
| 2016/0308457 | A1* | 10/2016 | Yuzurihara | H02M 7/48 |

* cited by examiner

*Primary Examiner* — Gary Nash

(57) ABSTRACT

The present invention discloses a single-phase non-isolated inverter, comprising: a first DC-side capacitor, a second DC-side capacitor, a first switch unit, a second switch unit, a third switch unit, a fourth switch unit, a fifth switch unit, a sixth switch unit, a seventh switch unit, and an eighth switch unit. When the single-phase non-isolated inverter is operated at a zero-voltage switching state, the seventh switch unit and the eighth switch unit are switched to short circuit for forming a short-circuit path between the bus lines. Briefly speaking, this novel single-phase non-isolated inverter has reactive power capability. In addition, according to an adjusting signal of a PI controller, micro controller of the single-phase non-isolated inverter is able to properly adjusts the duty cycle of a switch unit driving signal of the fifth switch unit and the sixth switch unit, so as to cancel the capacitor voltage unbalance between two DC-side capacitors.

7 Claims, 8 Drawing Sheets

SINGLE-PHASE NON-ISOLATED INVERTER

BACKGROUND OF THE INVENTION

1. Field of the Invention

The present invention relates to the technology field of power converting circuits, and more particularly to a single-phase non-isolated inverter for use in converting a DC power provided to an AC power.

2. Description of the Prior Art

In order to facilitate environment be sustainable developed, government by country has made great efforts to develop the use of green energies, so as to carry out the diversification of energy use. In all of the green energies, solar power and wind power are the most developmental.

DC-to-AC power converter is developed and used for converting the DC power provided by at least one battery of a green energy generating device to an AC power, such that the AC power is supplied to utility power grid. Non-isolated inverter is a new type of DC-to-AC power converter. FIG. 1 illustrates a schematic topology diagram of a full-bridge inverter with DC bypass (FB-DCBP). As FIG. 1 shows, the FB-DCBP circuit 1' is electrically connected between a photovoltaic (PV) array 2' of a green energy generating device such as photovoltaic array and a utility power grid 3', and comprises: a first switch unit S1', a second switch unit S2', a third switch unit S3', a fourth switch unit S4', a fifth switch unit S5', a sixth switch unit S6', a first diode D1', a second diode D2', a first DC-side capacitor Cdc1', and a second DC-side capacitor Cdc2'. Moreover, FIG. 1 also depicts that each of the switch units comprise one diode and one switch (such as MOS transistor).

Engineers skilled in development and manufacture of non-isolated inverters should know that, the filter 4' shown in FIG. 1 is configured to filter high-frequency harmonic portion of a output current/voltage of the FB-DCBP circuit 1'. On the other hand, the PV array 2' commonly has two stray capacitors (CpvP', CpvN') and the utility power grid 3' has a parasitic resistor R'. Particular technology feature of the FB-DCBP circuit 1' is that, the circuit common-mode voltage can be controlled to a constant value in every commutation cycle by modulating the duty cycle of the switch unit driving signal of the first switch unit S1' and the second switch unit S2', such that the leakage current of the PV array 2' can be effectively inhibited.

Even though the FB-DCBP circuit 1' has the advantage of being able to obviously cancel the leakage current of the PV array 2', the FB-DCBP circuit 1' still shows following drawbacks in practical use:

(1) Rise time and fall time of the first switch unit S1' and the second switch unit S2' may have time difference due to errors of semiconductor manufacturing processes. It is worth noting that, time difference between the rise time and the fall time would cause a circuit characteristics asymmetry occurring between the upper-arm DC bypass circuit and lower-arm DC bypass circuit of the FB-DCBP circuit 1'. As a result, capacitor voltage of the first DC-side capacitor would not be equal to the second DC-side capacitor's, and such capacitor voltage unbalance make the increase of the leakage current of the PV array 2'.

(2) FIG. 2 shows a schematic load test diagram of the FB-DCBP circuit. After using a 30-ohm resistor and a 80-mH inductor to complete a load testing operation for the FB-DCBP circuit 1', it is found that the FB-DCBP circuit 1' has no reactive power capability. The reason is that the first switch unit S1' and the second switch unit S2' cannot provide a short-circuit path between the bus lines under the state of the phase of the output voltage e' being different from the output current i', such as (e'>0, i'<0) and (e'<0, i'>0).

From above descriptions, it is clear that the FB-DCBP circuit 1' still shows shortcomings and drawbacks. In view of that, inventors of the present application have made great efforts to make inventive research thereon and eventually provided a single-phase non-isolated inverter for use in converting a DC power provided by at least one battery of a green energy generating device to an AC power.

SUMMARY OF THE INVENTION

Conventional FB-DCBP circuit includes main drawbacks of having no reactive power capability and capacitor voltage unbalance between two DC-side capacitors. Therefore, the primary objective of the present invention is to provide a single-phase non-isolated inverter, comprising: a first DC-side capacitor, a second DC-side capacitor, a first switch unit, a second switch unit, a third switch unit, a fourth switch unit, a fifth switch unit, a sixth switch unit, a seventh switch unit, and an eighth switch unit. Particularly, when the single-phase non-isolated inverter is operated at a zero-voltage switching state, the seventh switch unit and the eighth switch unit are switched to short circuit for forming a short-circuit path between the bus lines. Briefly speaking, this novel single-phase non-isolated inverter has reactive power capability.

On the other hand, it is able to further add a subtractor and a proportional-integral (PI) controller into the circuit framework of the single-phase non-isolated inverter. Therefore, the PI controller would output an adjusting signal to a micro controller of the single-phase non-isolated inverter based on an output signal of the subtractor, such that the micro controller properly adjusts the duty cycle of a switch unit driving signal of the fifth switch unit and the sixth switch unit until capacitor voltage unbalance between two DC-side capacitors is canceled.

Thus, for achieving the primary objective of the present invention, the inventor of the present invention provides an embodiment for the single-phase non-isolated inverter, which comprises:

a first DC-side capacitor coupled to an input DC voltage;
a second DC-side capacitor, wherein one end of the second DC-side capacitor is electrically connected to the other end of the first DC-side capacitor, and the other end of the second DC-side capacitor being coupled to the input DC voltage;
a first switch set, being electrically connected to the first DC-side capacitor and the second DC-side capacitor in parallel, and comprising first switch unit and a second switch unit serially connected to the first switch unit;
a second switch set, being electrically connected to the first switch set in parallel, and comprising third switch unit and a fourth switch unit serially connected to the third switch unit;
a fifth switch unit electrically connected between the first DC-side capacitor and the first switch unit;
a sixth switch unit electrically connected between the second DC-side capacitor and the second switch unit;
a seventh switch unit electrically connected between the first DC-side capacitor, the first switch unit and the fifth switch unit;

a eighth switch unit electrically connected between the second DC-side capacitor, the second switch unit and the sixth switch unit;

wherein the single-phase non-isolated inverter provides an output current in a positive half cycle as the first switch unit and the forth switch unit are switched to short circuit as well as the second switch unit and the third switch unit are switched to open circuit; moreover, when the first switch unit and the forth switch unit are switched to open circuit as well as the second switch unit and the third switch unit are switched to short circuit, the single-phase non-isolated inverter providing the output current in a negative half cycle;

wherein when the single-phase non-isolated inverter is operated at a zero-voltage switching state, the seventh switch unit and the eighth switch unit being switched to short circuit for forming a short-circuit path.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a single-phase non-isolated inverter according to the present invention, embodiments of the present invention will be described in detail with reference to the attached drawings hereinafter.

First Embodiment

Figure 3:
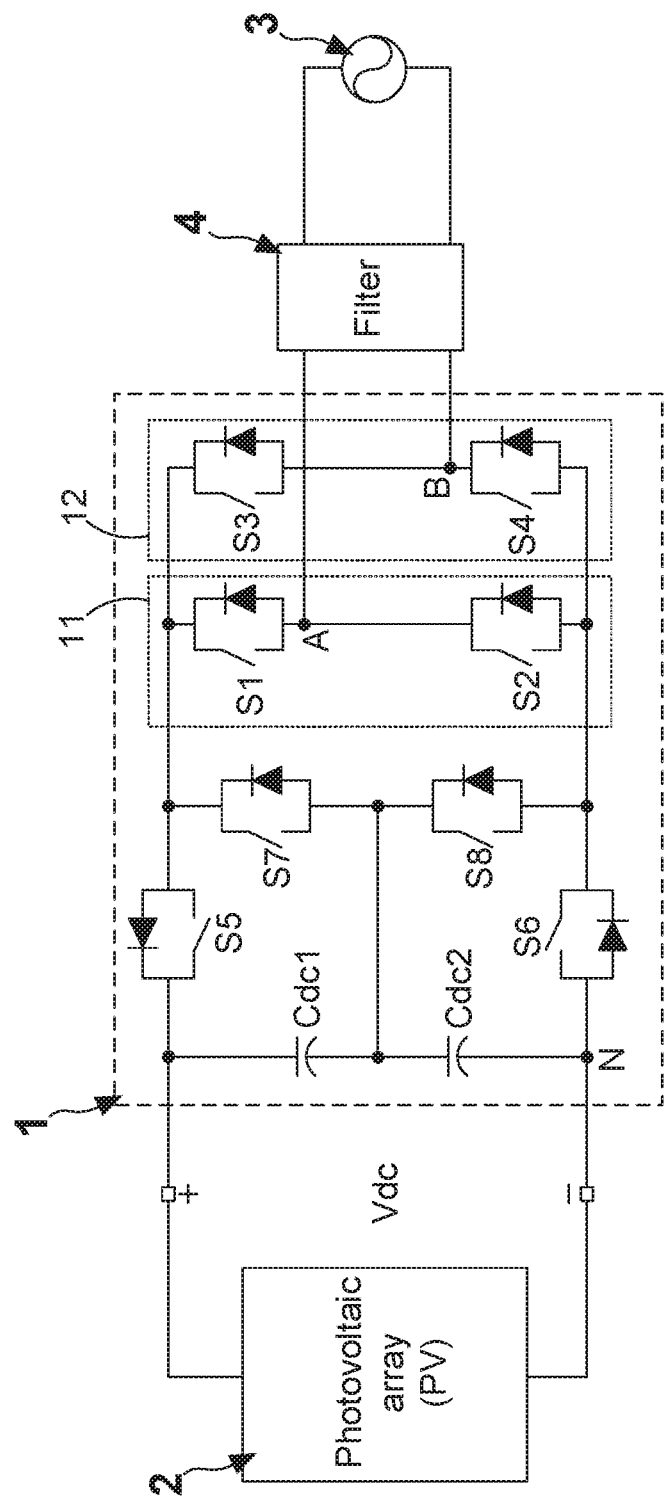
FIG. 3 shows a schematic topology diagram of a first embodiment of a single-phase non-isolated inverter according to the present invention.

With reference to FIG. 3, there is provided a schematic topology diagram of a first embodiment of a single-phase non-isolated inverter according to the present invention. The single-phase non-isolated inverter 1 of the present invention is use for converting a DC power to an AC power; for example, converting the DC power provided by at least one battery of a green energy generating device such as a photovoltaic (PV) array 2 to an AC power, so as to supply the AC power to a utility power grid 3. As FIG. 3 shows, this single-phase non-isolated inverter 1 comprises: a first DC-side capacitor Cdc1, a second DC-side capacitor Cdc2, a first switch set 11 comprising first switch unit S1 and a second switch unit S2 serially connected to the first switch unit S1, a second switch set 12 comprising third switch unit S3 and a fourth switch unit S4 serially connected to the third switch unit S3, a fifth switch unit S5, a sixth switch unit S6, a seventh switch unit S7, and an eighth switch unit S8. From FIG. 3, it is understood that each of the eight switch units (S1-S8) comprises a switch device (like a MOS transistor) and a diode electrically connected to the switch device in parallel. Moreover, at least one filter 4 is electrically connected between the utility power grid 3 and the single-phase non-isolated inverter 1, and configured for filtering a high-frequency harmonic portion of an output current or an output voltage of the single-phase non-isolated inverter 1.

The aforesaid green energy generating device can be but does not be limited to a solar energy generating device or a wind driven energy generating device. As FIG. 3 shows, the first DC-side capacitor Cdc1 is electrically connected to the PV array 2 by one end thereof. Moreover, one end of the second DC-side capacitor Cdc2 is electrically connected to the other end of the first DC-side capacitor Cdc1, and the other end of the second DC-side capacitor Cdc2 is coupled to an input DC voltage Vdc provided by the PV array 2. One the other hand, the first switch set 11 is electrically connected to the first DC-side capacitor Cdc1 and the second DC-side capacitor Cdc2 in parallel, and the second switch set 12 is electrically connected to the first switch set 11 in parallel. Moreover, the fifth switch unit S5 is electrically connected between the first DC-side capacitor Cdc1 and the first switch unit S1, and the sixth switch unit S6 is electrically connected between the second DC-side capacitor Cdc2 and the second switch unit S2. In addition, the seventh switch unit S7 is electrically connected between the first DC-side capacitor Cdc1, the first switch unit S1 and the fifth switch unit S5, and the eighth switch unit S8 is electrically connected between the second DC-side capacitor Cdc2, the second switch unit S2 and the sixth switch unit S6.

Figure 4:
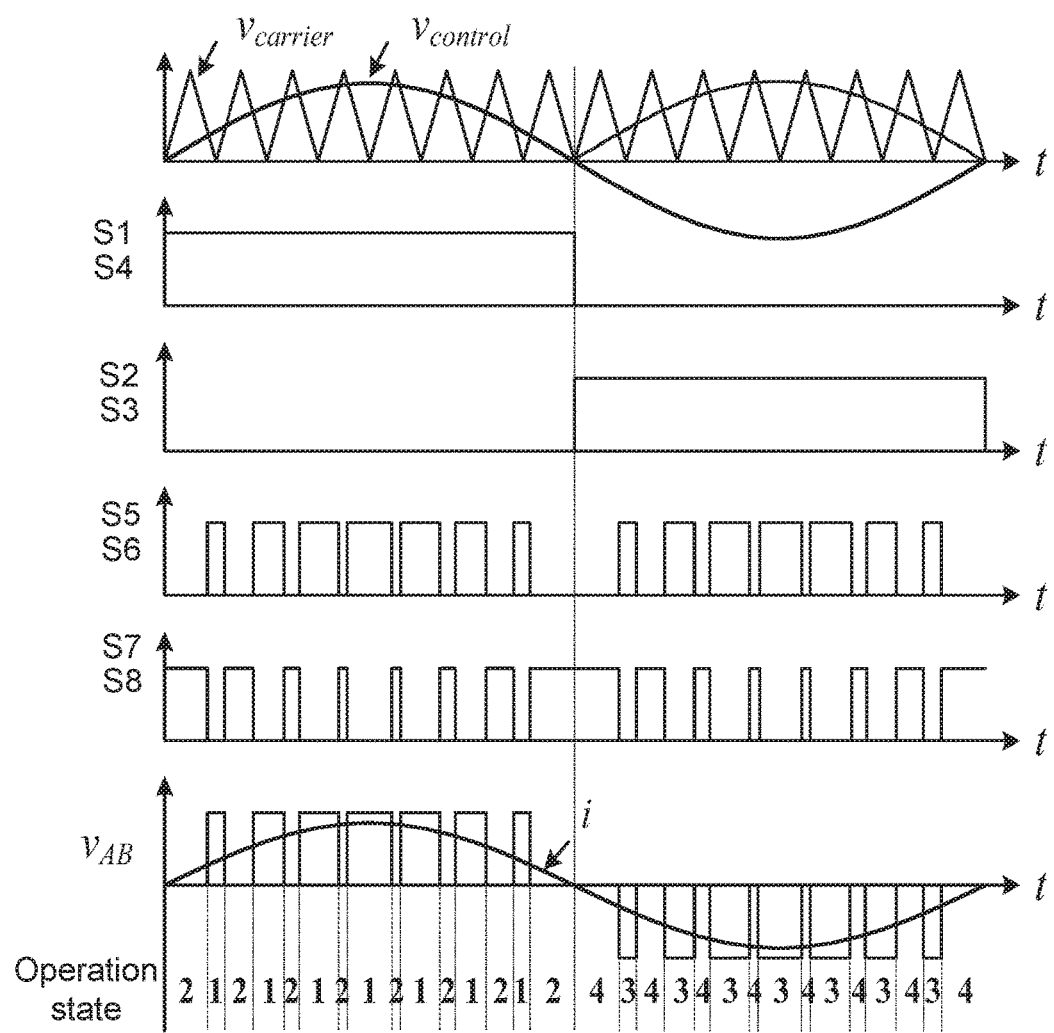
FIG. 4 shows signal waveform diagrams and exemplary timing diagrams of eight switch units of the single-phase non-isolated inverter.

FIG. 4 shows signal waveform diagrams and exemplary timing diagrams of the eight switch units of the single-phase non-isolated inverter. The signal waveforms includes a sine wave controlling signal ($V_{control}$), a triangular wave signal ($V_{carrier}$, also called carrier signal), and a $V_{AB}$ signal. In the present invention, each of the switch units (S1-S8) are selectively switched to short circuit or open circuit based on pre-set controlling conditions listed in following Table (1).

TABLE (1)

| Controlling conditions | ON/OFF of the switch units (S1-S8) |
|---|---|
| Vcontrol > 0 | The first switch unit S1 and the fourth switch unit S4 are switched to short circuit. The second switch unit S2 and the third switch unit S3 are switched to open circuit. |
| Vcontrol < 0 | The first switch unit S1 and the fourth switch unit S4 are switched to open circuit. The second switch unit S2 and the third switch unit S3 are switched to short circuit. |
| \|Vcontrol\| > Vcarrier | The fifth switch unit S5 and the sixth switch unit S6 are switched to short circuit. The seventh switch unit S7 and the eighth switch unit S8 are switched to open circuit. |
| \|Vcontrol\| < Vcarrier | The fifth switch unit S5 and the sixth switch unit S6 are switched to open circuit. The seventh switch unit S7 and the eighth switch unit S8 are switched to short circuit. |

Figure 5:
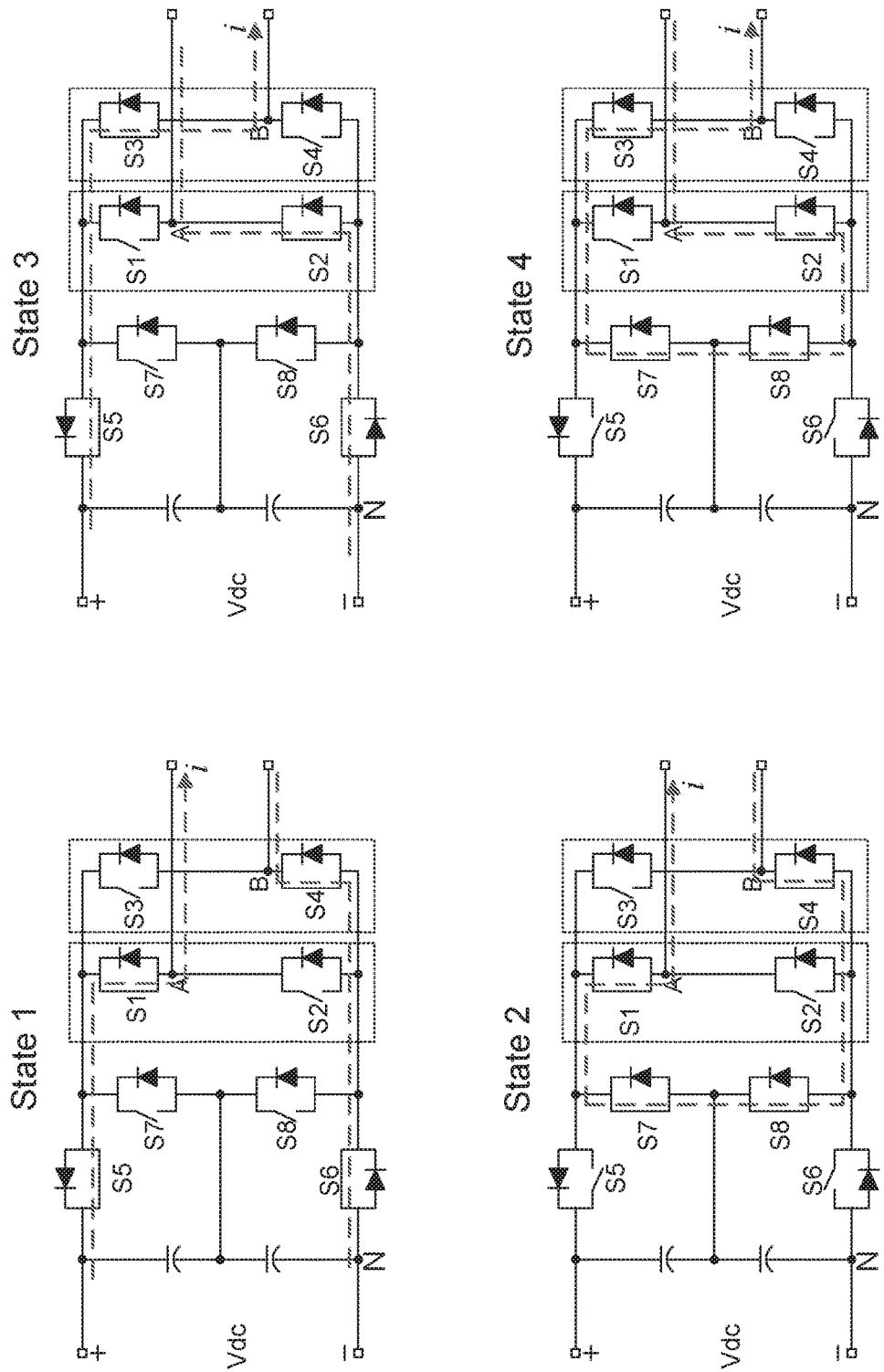
FIG. 5 shows circuit topology diagrams for describing four different operation states of the single-phase non-isolated inverter.

As a result, the single-phase non-isolated inverter 1 of the present invention has four operation states. FIG. 5 shows circuit topology diagrams for describing four different operation states of the single-phase non-isolated inverter. Moreover, switching states of each of the switch units (S1-S8) are integrated in following Table (2).

TABLE (2)

| Circuit operation states | Switching state of the switch units | Output current and common-mode voltage |
| --- | --- | --- |
| 1 | ON: S1, S4, S5, S6 OFF: S2, S3, S7, S8 | Input side of the inverter supplies positive current to output side, and common-mode voltage Vcm is equal to Vdc/2. |
| 2 | ON: S1, S4, S7, S8 OFF: S2, S3, S5, S6 | Input side of the inverter supplies positive current to output side at zero-voltage switching point (state), and meanwhile, common-mode voltage Vcm is equal to Vdc/2. |
| 3 | OFF: S1, S4, S7, S8 ON: S2, S3, S5, S6 | Input side of the inverter supplies negative current to output side, and common-mode voltage Vcm is equal to Vdc/2. |
| 4 | OFF: S1, S4, S5, S6 ON: S2, S3, S7, S8 | Input side of the inverter supplies negative current to output side at zero-voltage switching point (state), and meanwhile, common-mode voltage Vcm is equal to Vdc/2. |

From FIG. 4, FIG. 5 and Table (2), engineers skilled in development and manufacture of inverters are able to know that, the single-phase non-isolated inverter provides an output current in a positive half cycle as the first switch unit S1 and the forth switch unit S4 are switched to short circuit as well as the second switch unit S2 and the third switch unit S3 are switched to open circuit. On the contrary, when the first switch unit S1 and the forth switch unit S4 are switched to open circuit as well as the second switch unit S2 and the third switch unit S3 are switched to short circuit, the single-phase non-isolated inverter providing the output current in a negative half cycle. Moreover, when the single-phase non-isolated inverter is operated at a zero-voltage switching state (ponit), the seventh switch unit S7 and the eighth switch unit S7 being switched to short circuit for forming a short-circuit path.

Figure 1:
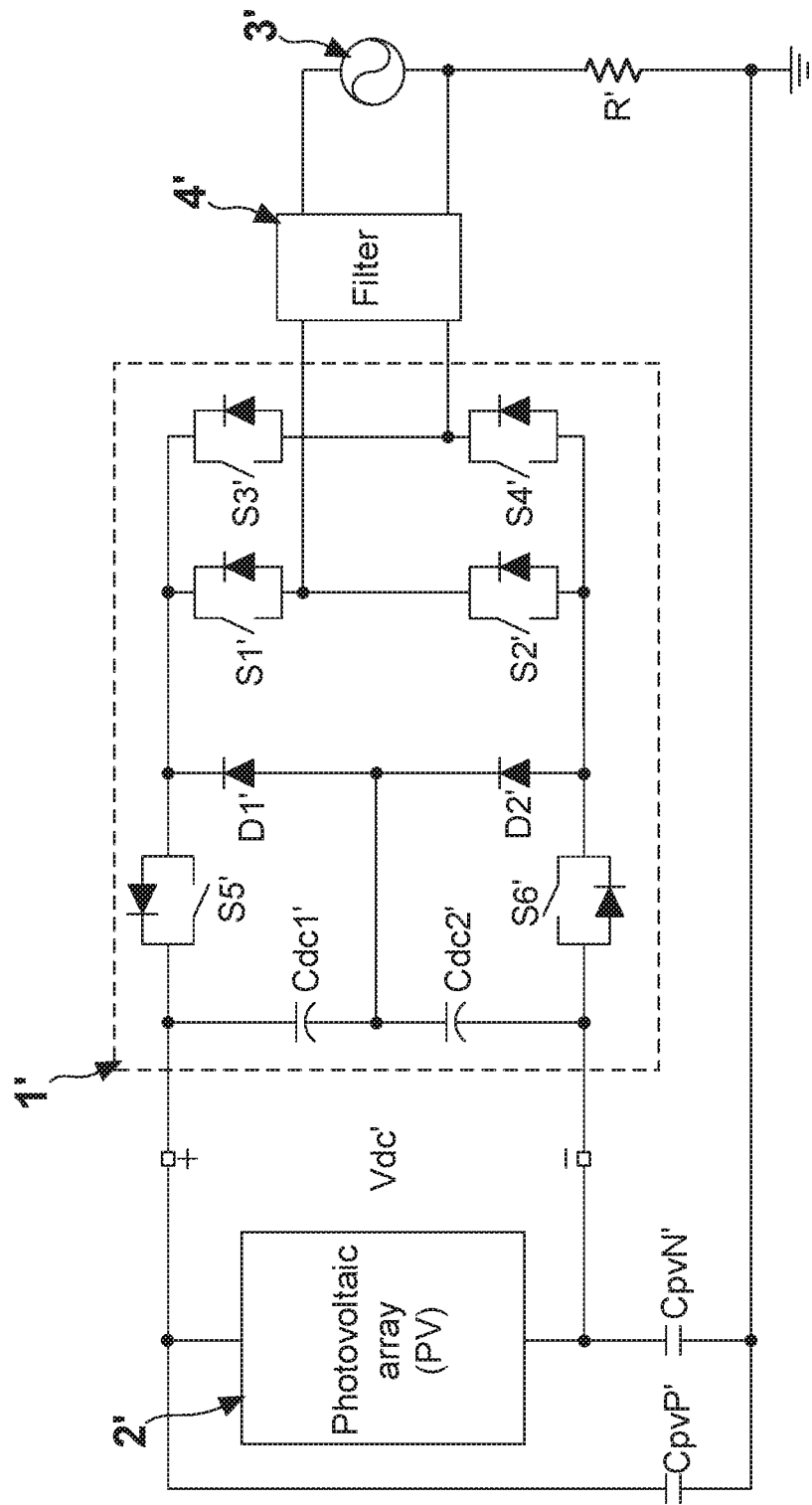
FIG. 1 shows a schematic topology diagram of a full-bridge inverter with DC bypass (FB-DCBP)
Figure 2:
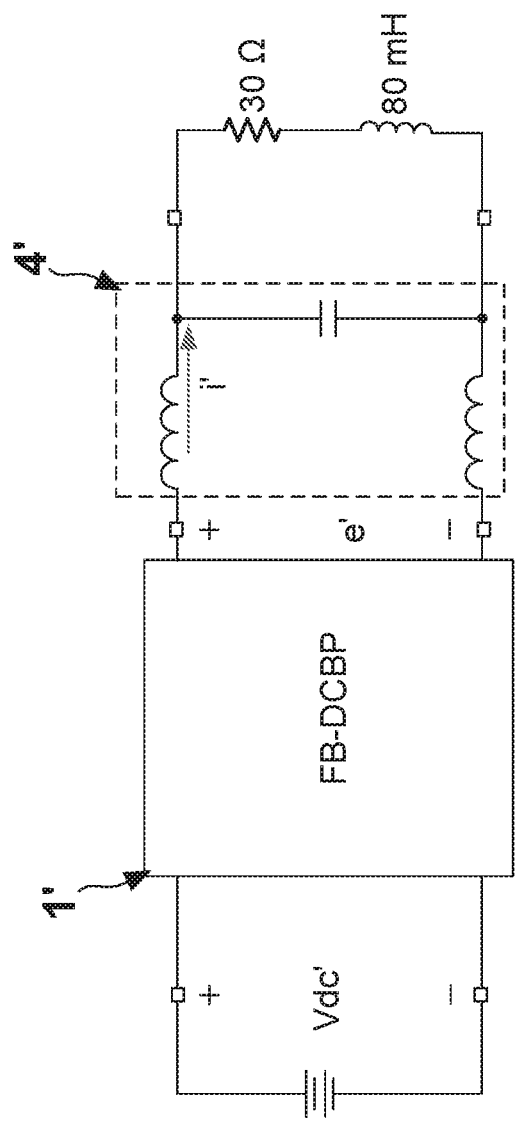
FIG. 2 shows a schematic load test diagram of the FB-DCBP circuit.

By properly controlling the switching states of the eight switch units (S1-S8), the common-mode voltage Vcm would be clamped at Vdc/2 under four different operation states of the single-phase non-isolated inverter 1. On the other hand, because the connection node between the seventh switch unit S7 and the eighth switch unit S8 is electrically connected to the connection node between the first DC-side capacitor Cdc1 and the second DC-side capacitor Cdc2, an identical voltage drop of Vdc/2 is across over each of the fifth switch unit S5, the sixth switch unit S6, the seventh switch unit S7, and the eighth switch unit S8. It is worth noting that, the voltage drop simultaneously across over the fifth switch unit S5' and the sixth switch unit S6' of the conventional FB-DCBP circuit 1' (as shown in FIG. 1) is Vdc'. As a result, the voltage drop of the switch units S5-S8 is equal to half of the voltage drop across over the fifth switch unit S5' and the sixth switch unit S6' of the conventional FB-DCBP circuit 1'.

Figure 6:
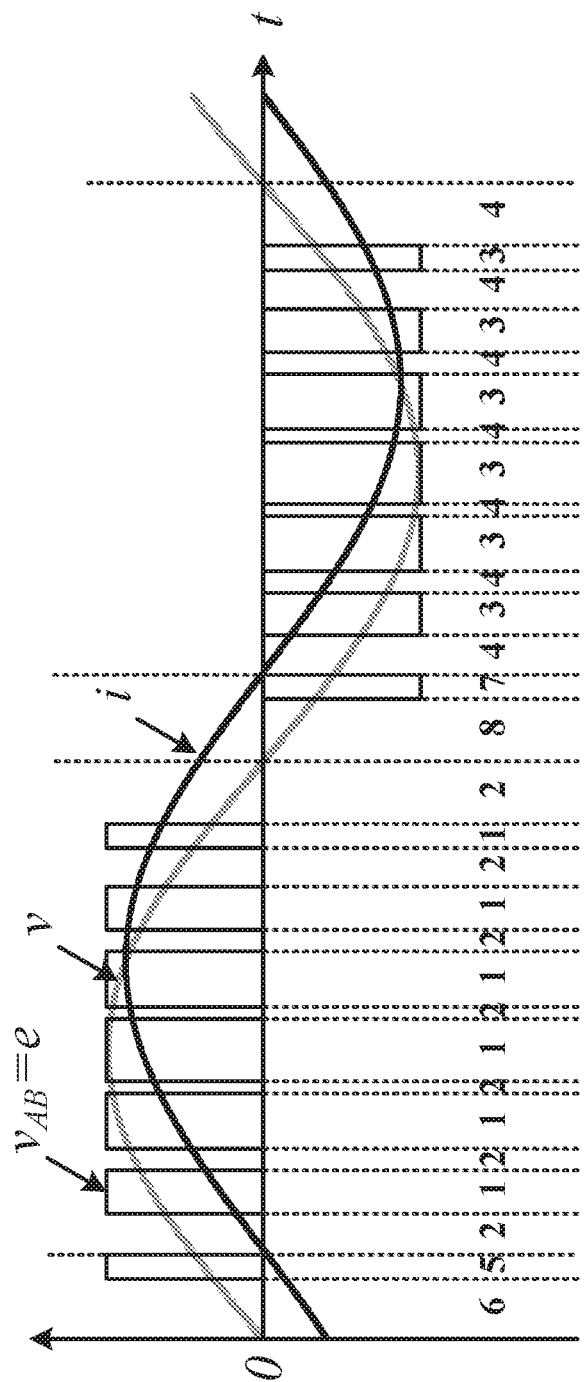
FIG. 6 shows waveform diagrams of output voltage and output current of the single-phase non-isolated inverter.
Figure 7:
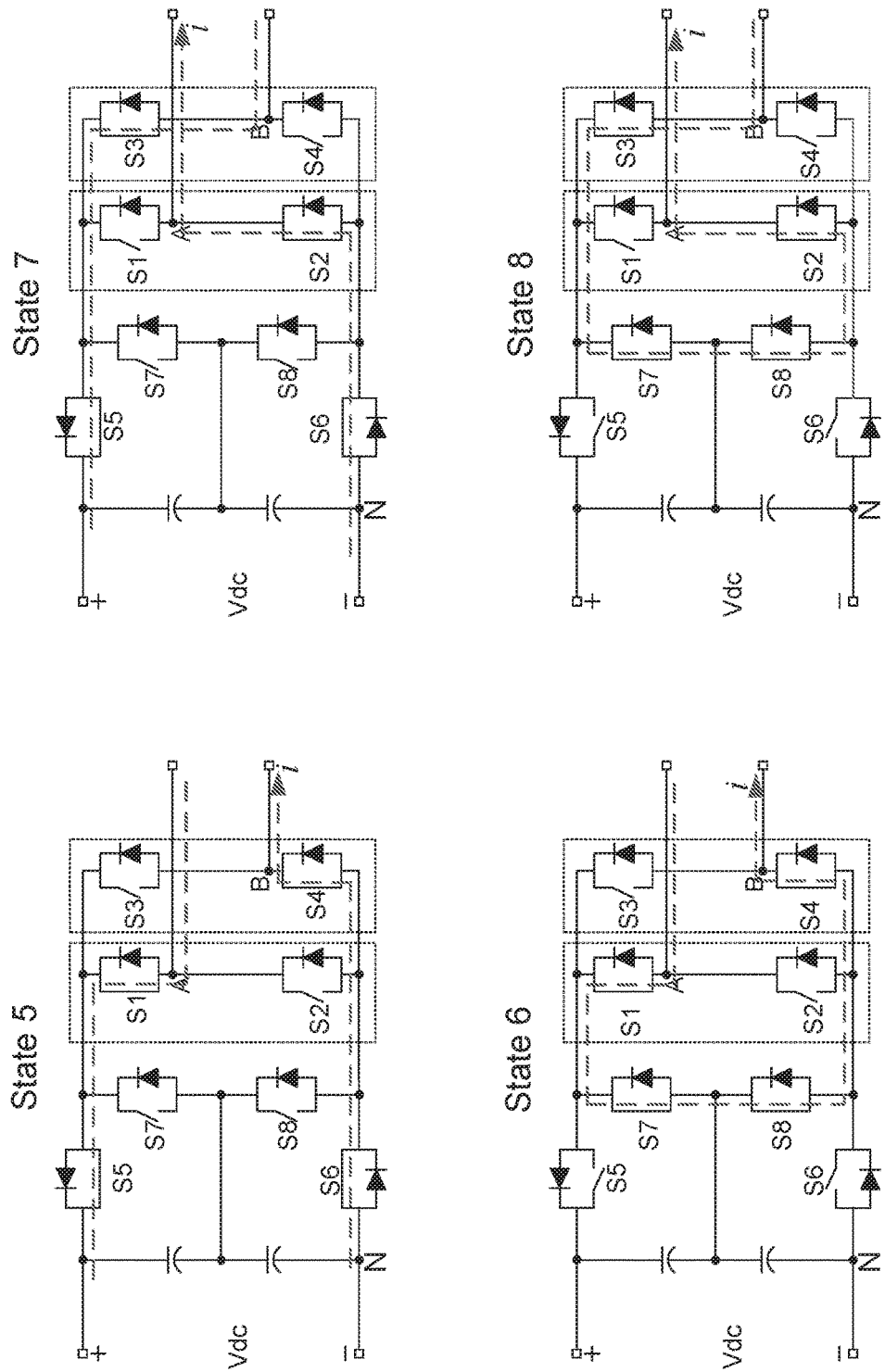
FIG. 7 shows circuit topology diagrams of the single-phase non-isolated inverter working in another four different operation states.

Please continuously refer to FIG. 6, which provides waveform diagrams of output voltage and output current of the single-phase non-isolated inverter. FIG. 6 particularly indicates that the single-phase non-isolated inverter 1 of the present invention have another four operation states 5-8. Moreover, FIG. 7 shows circuit topology diagrams of the single-phase non-isolated inverter working in another four different operation states. From FIG. 6 and FIG. 7, engineers skilled in development and manufacture of inverters are able to know that, the single-phase non-isolated inverter 1 supplies positive output voltage and negative output current to the utility power grid 3 during the operation states of 5 and 6. Moreover, when the single-phase non-isolated inverter 1 works in operation states of 7 and 8, negative output voltage and positive output current are supplied to the utility power grid 3. That is, no matter which operation state the single-phase non-isolated inverter 1 works in, short-circuit path is always formed for making positive current or negative current flowing from input side to output side. Briefly speaking, this novel single-phase non-isolated inverter 1 has reactive power capability.

Second Embodiment

Figure 8:
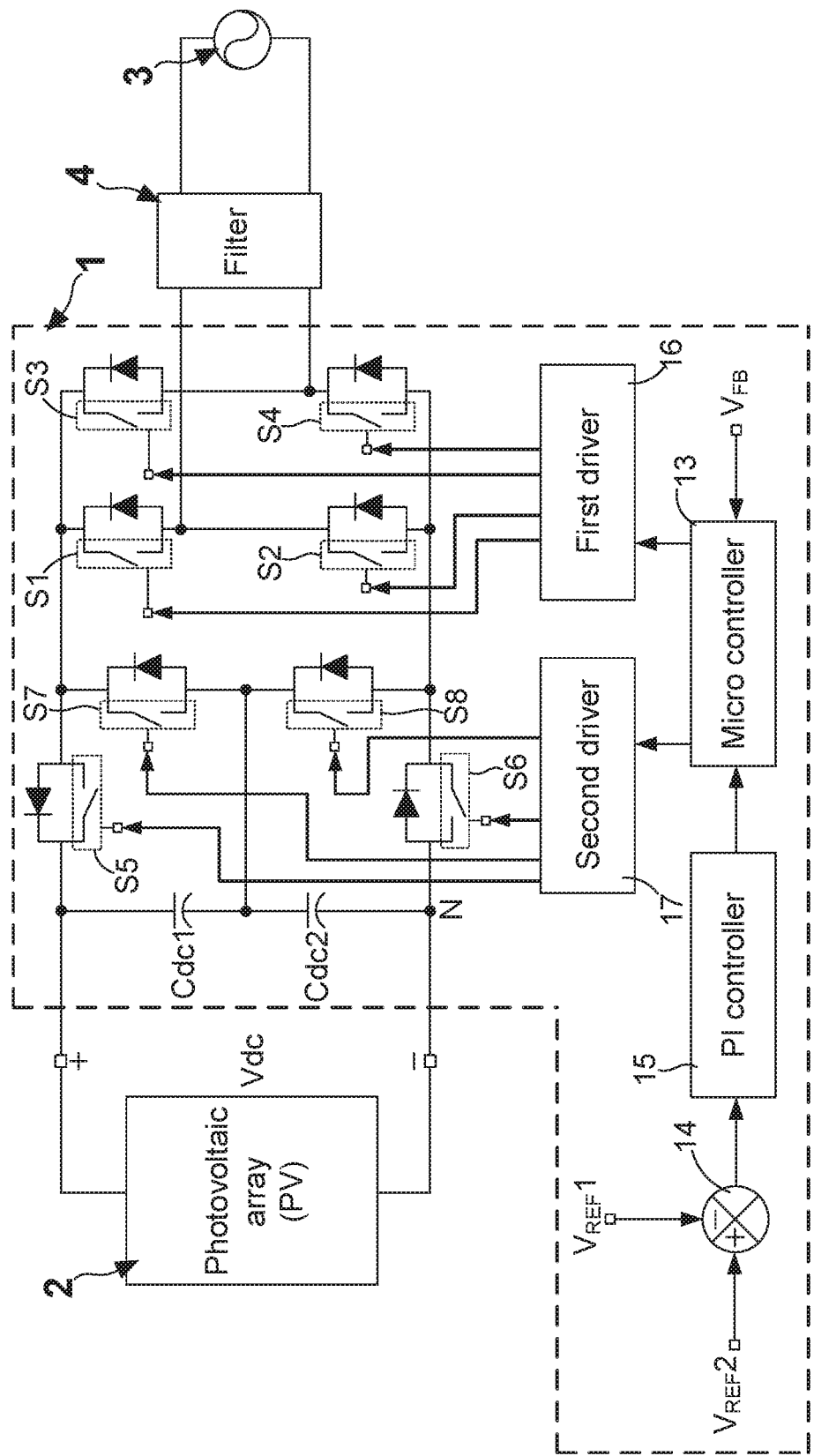
FIG. 8 shows a schematic topology diagram of a second embodiment of the single-phase non-isolated inverter according to the present invention.

FIG. 8 shows a schematic topology diagram of a second embodiment of the single-phase non-isolated inverter according to the present invention. After comparing FIG. 3 with FIG. 8, it is able to know that, the second embodiment further comprises a micro controller 13, a subtractor 14, a proportional-integral (PI) controller 15, wherein the micro controller 13 is used for controlling and switching the eight switch units (S1-S8) to short circuit or open circuit through a first driver 16 and a second driver 17. Moreover, the micro controller also 13 receives a feedback signal $V_{FB}$ from an error amplifier unit and at least one output signal detecting unit. It is worth explaining that, the switch unit driving signal for controlling and switching the switch units is obtained by comparing the sine wave controlling signal ($V_{control}$) with the carrier signal carrier signal ($V_{carrier}$) shown as FIG. 4. On the other hand, the subtractor 14 are coupled to a first reference voltage $V_{REF}1$ and a second reference voltage $V_{REF}2$, wherein the first reference voltage $V_{REF}1$ is half of the input DC voltage Vdc across over the input terminals (i.e., the DC side) of the single-phase non-isolated inverter 1, i.e., Vdc/2. On the other hand, the second reference voltage $V_{REF}2$ is the capacitor voltage of the second DC-side capacitor Cdc2.

In spite of the fact that above descriptions indicate that the common-mode voltage Vcm would be clamped at Vdc/2 under four different operation states of the single-phase non-isolated inverter 1, that does not imply that the capacitor voltage of the first DC-side capacitor Cdc1 would be equal to the first DC-side capacitor's Cdc1. The primary factor causing the capacitor voltage unbalance between the two DC-side capacitors is that rise time and fall time of the fifth switch unit S5, the sixth switch unit S6, the seventh switch unit S7, and the eighth switch unit S8 may have time difference due to errors of semiconductor manufacturing processes. Similarly, the first driver 16 and the second driver 17 may also have some circuit characteristic differences.

By adding the subtractor 14 and the PI controller 15 into the circuit framework of the single-phase non-isolated inverter 1, the PI would output an adjusting signal to the micro controller 13 of the single-phase non-isolated inverter 1 based on an output signal of the subtractor 14, such that the micro controller 13 properly adjusts the duty cycle of the switch unit driving signal of the fifth switch unit S5 and the sixth switch S6 unit until capacitor voltage unbalance between two DC-side capacitors (Cdc1, Cdc2) is canceled. The way to adjust the duty cycle of the switch unit driving signal can be described by following mathematic formulas:

$$D_{S5}^* = D^* + \Delta D^*$$

$$D_{S6}^* = D^* - \Delta D^*$$

In the mathematic formulas, D* means an initial duty cycle of the switch unit driving signal, and ΔD* represents an amount of adjustment for the duty cycle. For instance, the capacitor voltage unbalance between the two DC-side capacitors (Cdc1, Cdc2) has the maximum value at the boot instant of the single-phase non-isolated inverter 1. In the meantime, a specific ΔD* with maximum value is calculated by the PI controller 15 for accelerating the first DC-side capacitor Cdc1 to release charges to the output side. Moreover, with the fact that the capacitor voltage unbalance between the two DC-side capacitors (Cdc1, Cdc2) is gradually reduced and eventually canceled, value of ΔD* is getting smaller and eventually be constant.

Therefore, through above descriptions, the single-phase non-isolated inverter 1 of the present invention has been introduced completely and clearly; in summary, the present invention includes the advantages of:

(1) As FIG. 1 shows, conventional FB-DCBP circuit 1' includes main drawbacks of having no reactive power capability and capacitor voltage unbalance between two DC-side capacitors (Cdc1', Cdc2'). In view of that, the present invention particularly provides a single-phase non-isolated inverter 1, comprising: a first DC-side capacitor Cdc1, a second DC-side capacitor Cdc2, a first switch unit S1, a second switch unit S2, a third switch unit S3, a fourth switch unit S4, a fifth switch unit S5, a sixth switch unit S6, a seventh switch unit S7, and an eighth switch unit S8. Particularly, when this single-phase non-isolated inverter 1 is operated at a zero-voltage switching state (point), the seventh switch unit S7 and the eighth switch unit S8 are switched to short circuit for forming a short-circuit path between the bus lines. Briefly speaking, this novel single-phase non-isolated inverter 1 has reactive power capability.

(2) Moreover, it can further add a subtractor 13 and a proportional-integral (PI) controller 15 into the circuit framework of the single-phase non-isolated inverter 1. As a result, the PI controller 15 would output an adjusting signal to a micro controller 13 of the single-phase non-isolated inverter 1 based on an output signal of the subtractor 13, such that the micro controller 13 properly adjusts the duty cycle of a switch unit driving signal of the fifth switch unit S5 and the sixth switch unit S6 until capacitor voltage unbalance between two DC-side capacitors (Cdc1, Cdc2) is canceled.

The above description is made on embodiments of the present invention. However, the embodiments are not intended to limit scope of the present invention, and all equivalent implementations or alterations within the spirit of the present invention still fall within the scope of the present invention.

What is claimed is:
1. A single-phase non-isolated inverter, comprising:
   a first DC-side capacitor coupled to an input DC voltage;
   a second DC-side capacitor, wherein one end of the second DC-side capacitor is electrically connected to the other end of the first DC-side capacitor, and the other end of the second DC-side capacitor being coupled to the input DC voltage;
   a first switch set, being electrically connected to the first DC-side capacitor and the second DC-side capacitor in parallel, and comprising first switch unit and a second switch unit serially connected to the first switch unit;
   a second switch set, being electrically connected to the first switch set in parallel, and comprising third switch unit and a fourth switch unit serially connected to the third switch unit;
   a fifth switch unit electrically connected between the first DC-side capacitor and the first switch unit;
   a sixth switch unit electrically connected between the second DC-side capacitor and the second switch unit;
   a seventh switch unit electrically connected between the first DC-side capacitor, the first switch unit and the fifth switch unit; and
   an eighth switch unit electrically connected between the second DC-side capacitor, the second switch unit and the sixth switch unit;
   wherein the single-phase non-isolated inverter provides an output current in a positive half cycle as the first switch unit and the forth switch unit are switched to short circuit as well as the second switch unit and the third switch unit are switched to open circuit; moreover, when the first switch unit and the forth switch unit are switched to open circuit as well as the second switch unit and the third switch unit are switched to short circuit, the single-phase non-isolated inverter providing the output current in a negative half cycle;
   wherein when the single-phase non-isolated inverter is operated at a zero-voltage switching state, the seventh switch unit and the eighth switch unit being switched to short circuit for forming a short-circuit path.

2. The single-phase non-isolated inverter of claim 1, further comprising:
   a micro controller for controlling and switching the eight switch units to short circuit or open circuit.

3. The single-phase non-isolated inverter of claim 2, further comprising:
   a subtractor, being coupled to a first reference voltage and a second reference voltage; and
   a proportional-integral (PI) controller, being electrically connected to the subtractor so as to output an adjusting signal to the micro controller based on an output signal of the subtractor, such that the micro controller properly adjusts the duty cycle of a switch unit driving signal of the fifth switch unit and the sixth switch unit.

4. The single-phase non-isolated inverter of claim 3, wherein the first reference voltage is half of the input DC voltage across over the input terminals of the single-phase non-isolated inverter, and the second reference voltage is a capacitor voltage of the second DC-side capacitor.

5. The single-phase non-isolated inverter of claim 1, wherein each of the eight switch units comprises a switch device and a diode electrically connected to the switch device in parallel.

6. The single-phase non-isolated inverter of claim 1, wherein the connection node between the seventh switch unit and the eighth switch unit is electrically connected to the connection node between the first DC-side capacitor and the second DC-side capacitor.

7. The single-phase non-isolated inverter of claim 1, wherein at least one filter is electrically connected between the utility power grid and the single-phase non-isolated inverter, configured for filtering a high-frequency harmonic portion of the output current or an output voltage of the single-phase non-isolated inverter.

* * * * *